(12) United States Patent
Wang et al.

(10) Patent No.: US 11,460,810 B2
(45) Date of Patent: Oct. 4, 2022

(54) HOLOGRAPHIC REPRODUCTION DEVICE, HOLOGRAPHIC REPRODUCTION SYSTEM AND HOLOGRAPHIC DISPLAY SYSTEM

(71) Applicants: Fuzhou BOE Optoelectronics Technology Co., Ltd., Fujian (CN); BOE Technology Group Co., Ltd., Beijing (CN)

(72) Inventors: Jin Wang, Beijing (CN); Changhong Shi, Beijing (CN); Jiamin Liao, Beijing (CN); Yao Liu, Beijing (CN); Wenchang Tao, Beijing (CN); Zuwen Liu, Beijing (CN); Zihua Zhuang, Beijing (CN); Hao Cheng, Beijing (CN); Hongjiang Wu, Beijing (CN); Xi Chen, Beijing (CN)

(73) Assignees: FUZHOU BOE OPTOELECTRONICS TECHNOLOGY CO., LTD., Fujian (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 17 days.

(21) Appl. No.: 16/832,546

(22) Filed: Mar. 27, 2020

(65) Prior Publication Data
US 2020/0409308 A1 Dec. 31, 2020

(51) Int. Cl.
*G03H 1/26* (2006.01)
*G02F 1/1335* (2006.01)
*G03H 1/00* (2006.01)

(52) U.S. Cl.
CPC ....... *G03H 1/268* (2013.01); *G02F 1/133504* (2013.01); *G02F 1/133555* (2013.01);
(Continued)

(58) Field of Classification Search
CPC ............. G03H 2001/0224; G03H 1/02; G03H 1/2294; G03H 2225/60; G03H 2225/22;
(Continued)

(56) References Cited

U.S. PATENT DOCUMENTS

| 5,594,559 A | 1/1997 | Sato et al. |
| 6,437,919 B1 * | 8/2002 | Brown ................. G03H 1/2294 359/462 |

(Continued)

FOREIGN PATENT DOCUMENTS

| CN | 101467107 A | 6/2009 |
| CN | 104849992 A | 8/2015 |

(Continued)

OTHER PUBLICATIONS

Office Action dated Dec. 2, 2020 for application No. CN201910579650.9 with English translation attached.

*Primary Examiner* — Mariam Qureshi
(74) *Attorney, Agent, or Firm* — Nath, Goldberg & Meyer; Joshua B. Goldberg

(57) ABSTRACT

The present disclosure provides a holographic reproduction device, a holographic reproduction system, and a holographic display system. The holographic reproduction device includes a first light source configured to provide first coherent light; at least one electrically addressed liquid crystal display panel configured to display a holographic interferogram, so that the first coherent light is diffracted when the first coherent light transmits through the holographic interferogram to present a holographic reproduction image. A liquid crystal material of the electrically addressed liquid crystal display panel includes smectic liquid crystal.

12 Claims, 9 Drawing Sheets

(52) U.S. Cl.
CPC ....... *G03H 1/0005* (2013.01); *G02F 2203/02* (2013.01); *G03H 2001/0055* (2013.01); *G03H 2225/22* (2013.01); *G03H 2225/52* (2013.01)

(58) Field of Classification Search
CPC .. G03H 1/0005; G03H 1/268; G02F 1/13781; G02F 1/133504
See application file for complete search history.

(56) References Cited

U.S. PATENT DOCUMENTS

| | | | |
|---|---|---|---|
| 7,006,234 B1* | 2/2006 | Cottrell | G01J 9/02 356/521 |
| 7,796,103 B2* | 9/2010 | Doane | G02F 1/1334 345/87 |
| 2005/0041271 A1 | 2/2005 | Tomoyoshi | |
| 2018/0067456 A1* | 3/2018 | Zhang | G03H 1/268 |
| 2020/0111119 A1* | 4/2020 | Singhal | G06Q 30/0251 |

FOREIGN PATENT DOCUMENTS

| | | |
|---|---|---|
| CN | 105551508 A | 5/2016 |
| EP | 0153147 A2 | 8/1985 |

\* cited by examiner incident light

HOLOGRAPHIC REPRODUCTION DEVICE, HOLOGRAPHIC REPRODUCTION SYSTEM AND HOLOGRAPHIC DISPLAY SYSTEM

CROSS-REFERENCE TO RELATED APPLICATIONS

The present disclosure claims the priority of Chinese Patent Application No. 201910579650.9, filed on Jun. 28, 2019, the contents of which are incorporated herein by reference in its entirety.

TECHNICAL FIELD

The present disclosure relates to the field of holographic display technology, and in particular, to a holographic reproduction device, a holographic reproduction system, and a holographic display system.

BACKGROUND

More and more attention has been paid to stereoscopic display based on holographic information. During a recording process of holographic information, two beams, i.e. a reference beam and an object beam, which transmit along different paths, interfere with each other to form an optical interference pattern. The optical interference pattern causes a chemical or physical change in the photosensitive recording medium so that information about a recorded object is recorded in the recording medium. During the holographic reproduction process, a reference beam similar to the reference beam used for recording is incident onto the recording medium, and the reference beam transmitting through the optical interference pattern in the recording medium is diffracted to reproduce the object beam, thereby reproducing information.

SUMMARY

As an aspect, a holographic reproduction device is provided. The holographic reproduction device includes: at least one electrically addressed liquid crystal display panel configured to display a holographic interferogram or holographic interference image; and a first light source configured to provide first coherent light which is diffracted when transmitting through the holographic interferogram to present a holographic reproduction image; wherein a liquid crystal material of the electrically addressed liquid crystal display panel includes smectic liquid crystal.

In an embodiment, the electrically addressed liquid crystal display panel is a reflective liquid crystal display panel, the first light source is on a viewing side of the electrically addressed liquid crystal display panel, and a side of the electrically addressed liquid crystal display panel distal to the viewing side is provided with a reflective layer.

In an embodiment, the viewing side of the electrically addressed liquid crystal display panel is provided with a first transflective structure and a first reflective structure, the first transflective structure is configured to transmit a portion of the first coherent light received from the first light source to the first reflective structure, the first reflective structure is configured to reflect light received from the first transflective structure to the first transflective structure, and the first transflective structure is further configured to reflect light received from the first reflective structure to the electrically addressed liquid crystal display panel, and transmit light reflected by the reflective layer of the electrically addressed liquid crystal display panel.

In an embodiment, the electrically addressed liquid crystal display panel is a transmissive liquid crystal display panel, and the first light source is on a side of the electrically addressed liquid crystal display panel distal to a viewing side.

In an embodiment, the holographic reproduction device includes N electrically addressed liquid crystal display panels, where N is greater than or equal to 2. All of the electrically addressed liquid crystal display panels are sequentially spliced, such that pictures displayed by all of the electrically addressed liquid crystal display panels are spliced to form the holographic interferogram, and any two adjacent electrically addressed liquid crystal display panels are spliced together to form a dihedral angle larger than or equal to 90 degrees and smaller than 180 degrees.

In an embodiment, among all of the electrically addressed liquid crystal display panels, a side, distal to the viewing side, of each of the electrically addressed liquid crystal display panels except a last electrically addressed liquid crystal display panel is provided with a second transflective structure. A side of the last electrically addressed liquid crystal display panel distal to the viewing side is provided with a second reflective structure. The first light source is on a side of a second transflective structure corresponding to a first electrically addressed liquid crystal display panel distal to the viewing side. The second transflective structure on a side of the first electrically addressed liquid crystal display panel distal to the viewing side is configured to transmit a portion of the first coherent light received from the first light source to the first electrically addressed liquid crystal display panel, and transmit another portion of the first coherent light received from the first light source to a second transflective structure on a side of a second electrically addressed liquid crystal display panel distal to the viewing side, the second electrically addressed liquid crystal display panel being adjacent to the first electrically addressed liquid crystal display panel. A second transflective structure on a side of an $i^{th}$ electrically addressed liquid crystal display panel distal to the viewing side is configured to reflect a portion of received coherent light to the $i^{th}$ electrically addressed liquid crystal display panel, and transmit another portion of the received coherent light to a second transflective structure or the second reflective structure on a side of a $(i+1)^{th}$ electrically addressed liquid crystal display panel distal to the viewing side, the $(i+1)^{th}$ electrically addressed liquid crystal display panel being adjacent to the $i^{th}$ electrically addressed liquid crystal display panel, and $1 \leq i \leq N-1$. The second reflective structure on a side of an $N^{th}$ electrically addressed liquid crystal display panel distal to the viewing side is configured to reflect received light to the Nm electrically addressed liquid crystal display panel.

In an embodiment, a second transflective structure on the side of the first electrically addressed liquid crystal display panel distal to the viewing side has a light transmittance of $$\frac{1}{N},$$

and the second transflective structure on the side of the $i^{th}$ electrically addressed liquid crystal display panel distal to the viewing side has a light transmittance of $$1 - \frac{1}{N-i}.$$

In an embodiment, N is equal to 2.

In an embodiment, the first light source is a laser light source.

In an embodiment, the holographic reproduction device further includes: a first len, on a light outgoing path of the first light source and configured to expand light emitted from the first light source; and a second len, on the viewing side of the electrically addressed liquid crystal display panel and configured to converge light from the electrically addressed liquid crystal display panel.

In an embodiment, the holographic reproduction device is a 3D billboard or a 3D electronic label.

As another aspect, a holographic reproduction system including the above holographic reproduction device is provided.

As another aspect, a holographic display system including the above holographic reproduction system is provided.

In an embodiment, the holographic display system further includes a holographic recording system configured to generate a holographic interferogram of a recorded object, and send display data corresponding to the holographic interferogram to the electrically addressed liquid crystal display panel.

In an embodiment, the holographic recording system includes a second light source, a third transflective structure, a third reflective structure and a holographic plate. The second light source is configured to provide second coherent light. The third transflective structure is configured to reflect a portion, as a reference beam, of the second coherent light received from the second light source to the holographic plate, and transmit another portion of the second coherent light received from the second light source to the third reflective structure. The third reflective structure is configured to reflect light received from the third transflective structure to the recorded object, so that the light incident onto the recorded object is reflected by a surface of the recorded object and then propagates as an object beam to the holographic plate. The holographic plate is configured to receive the reference beam and the object beam, and generate the holographic interferogram of the recorded object formed after the reference beam and the object beam interfere.

In an embodiment, the holographic plate includes a charge-coupled device.

In an embodiment, the second light source is a laser light source.

DETAILED DESCRIPTION

In order to make those skilled in the art better understand the technical solutions of the present disclosure, a holographic reproduction device, a holographic reproduction system, and a holographic display system provided by the present disclosure are described in detail below with reference to the accompanying drawings.

Figure 1:
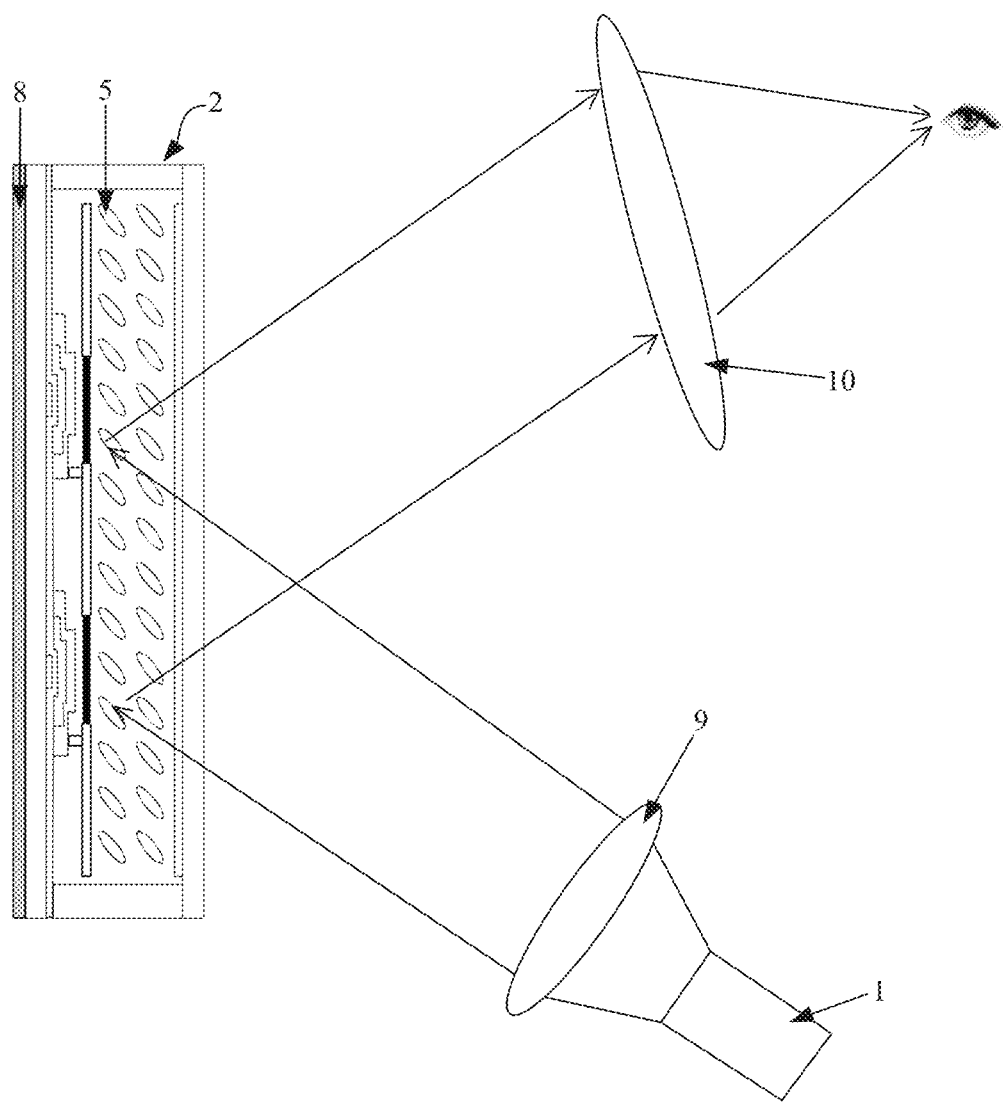
FIG. 1 is a schematic diagram showing a structure of a holographic reproduction device according to an embodiment of the present disclosure.
Figure 2:
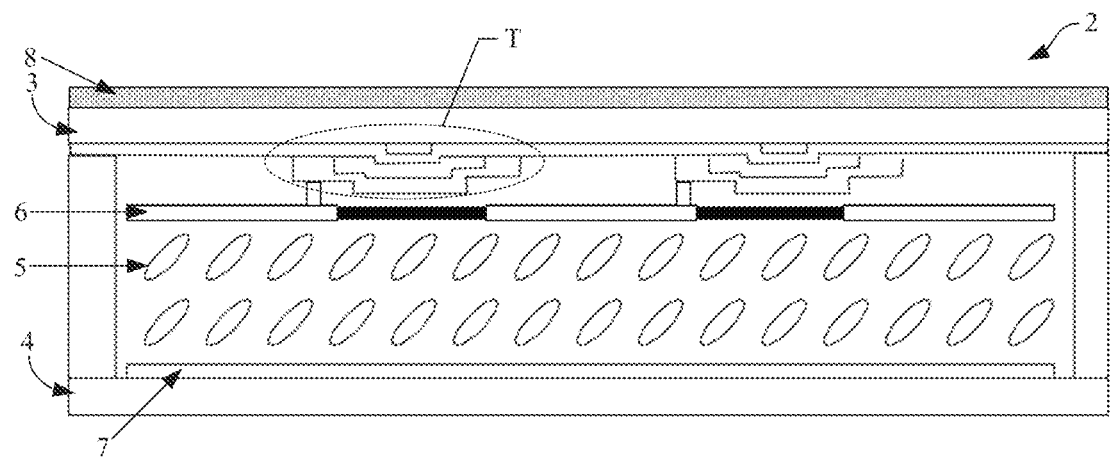
FIG. 2 is a schematic diagram showing a structure of an electrically addressed liquid crystal display (LCD) panel of FIG. 1.

FIG. 1 is a schematic diagram showing a structure of a holographic reproduction device according to an embodiment of the present disclosure, and FIG. 2 is a schematic diagram showing a structure of an electrically addressed liquid crystal display panel of FIG. 1. As shown in FIG. 1 and FIG. 2, the holographic reproduction device includes: a first light source 1 and at least one electrically addressed liquid crystal display panel 2 (EALCD for short). The first light source 1 provides first coherent light. The liquid crystal material in the electrically addressed liquid crystal display panel 2 includes smectic liquid crystal. The at least one electrically addressed liquid crystal display panel 2 is configured to display a holographic interferogram, so that the first coherent light is diffracted to present a holographic reproduction image.

In some embodiments, the first light source 1 is a laser light source, since the laser light source has good coherence.

It should be noted that there may be one or more electrically addressed liquid crystal display panels 2 in the present disclosure. FIG. 1 shows only one electrically addressed liquid crystal display panel 2, and embodiments in which a plurality of electrically addressed liquid crystal display panels 2 are provided will be described below.

The principle of the holographic reproduction device provided by the present disclosure is as follows: when holographic reproduction is needed, the electrically addressed liquid crystal display panel 2 displays a holographic interferogram of a recorded object, the holographic interferogram is irradiated with the first coherent light generated by the first light source 1, and the first coherent light transmitting through the holographic interferogram is diffracted to reproduce light wave information of the object beam, thereby realizing holographic reproduction. It should be noted that the detailed principle for implementing holographic reproduction based on the holographic interferogram will be described in detail later.

The principle of displaying a holographic interferogram by the electrically addressed liquid crystal display panel 2 in the present disclosure will be described below in detail with reference to the accompanying drawings.

The electrically addressed liquid crystal display panel shown in FIGS. 1 and 2 is a reflective electrically addressed liquid crystal display panel 2, that is, a reflective layer 8 is provided on a side of the electrically addressed liquid crystal display panel 2 distal to a viewing side (i.e., people look at images from the viewing side), and a light source is located on the viewing side of the electrically addressed liquid crystal display panel 2.

Figure 3A:
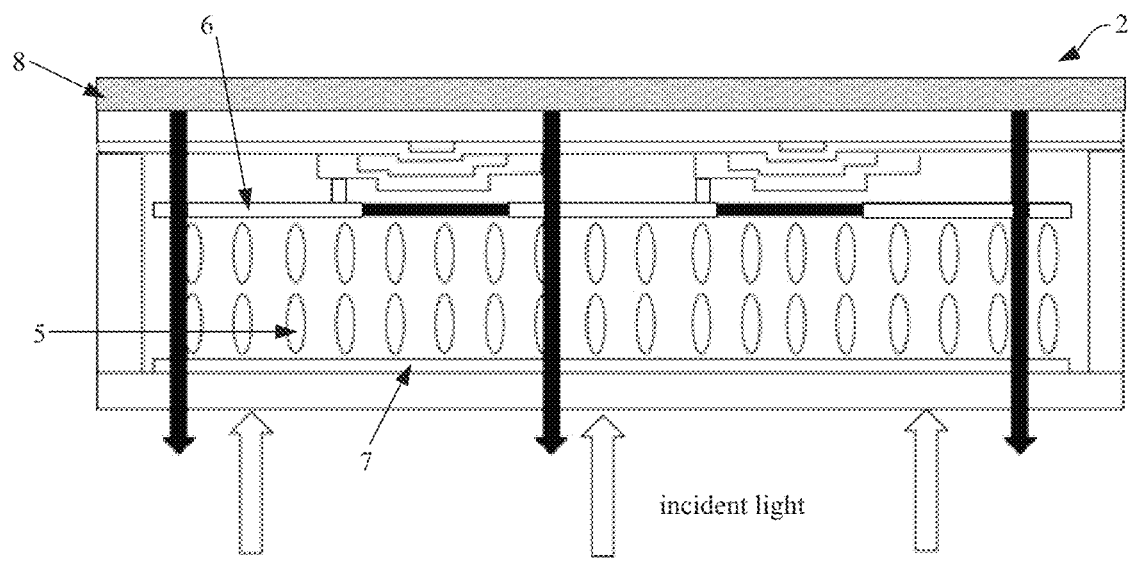
FIG. 3a is a schematic diagram showing the electrically addressed liquid crystal display panel of FIG. 2 in a light transmitting state.
Figure 3B:
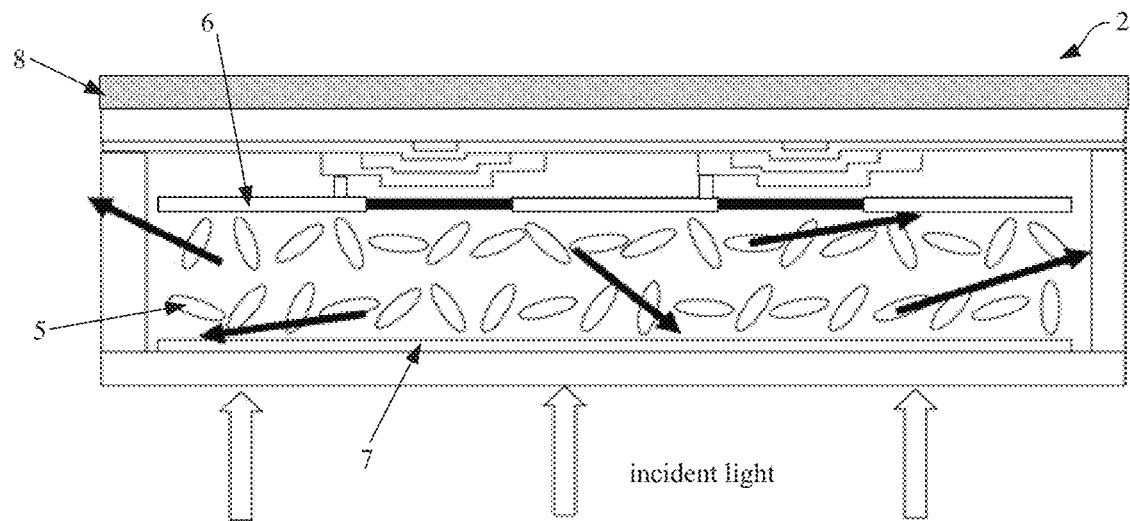
FIG. 3b is a schematic diagram showing the electrically addressed liquid crystal display panel of FIG. 2 in a light scattering state.

FIG. 3a is a schematic diagram showing the electrically addressed liquid crystal display panel of FIG. 2 in a light transmitting state, and FIG. 3b is a schematic diagram showing the electrically addressed liquid crystal display panel of FIG. 2 in a light scattering state. As shown in FIG. 3a and FIG. 3b, in the present disclosure, the electrically addressed liquid crystal display panel 2 includes a first substrate 3 and a second substrate 4 which are opposite to each other with liquid crystal 5 disposed therebetween. A gate line (not shown), a data line (not shown) and an array of pixel units are formed on the first substrate 3. Each pixel unit includes: a thin film transistor T and a pixel electrode 6. A common electrode 7 is formed on the second substrate 4, and an electric field for controlling the deflection of the liquid crystal 5 may be formed between the pixel electrodes 6 and the common electrode 7.

In the present disclosure, the liquid crystal 5 in the electrically addressed liquid crystal display panel 2 is a smectic liquid crystal having a two-dimensional ordered characteristic, that is, the liquid crystal molecules flow in one layer and do not flow between layers. Referring to FIG. 3a, when a first predetermined voltage $V_0$ is applied to the pixel electrodes 6 via data lines, the liquid crystal molecules are in a regular arrangement state, the pixel units are in a light transmitting state (i.e., a bright state), and a corresponding light transmittance is $Q_0$; referring to FIG. 3b, when a second predetermined voltage $V_1$ is applied to the pixel electrodes 6 via the data lines, the liquid crystal molecules 5 are in a disordered arrangement state, the pixel units are in a light scattering state (i.e., a dark state), and a corresponding light transmittance is $Q_1$. When a voltage in a range from $V_0$ to $V_1$ is applied to the pixel electrodes 6, the pixel units liquid crystal molecules 5 are in a state between the light transmitting state and the light scattering state, a corresponding light transmittance is between $Q_0$ and $Q_1$. In this way, the light intensity can be adjusted to correspond to various display gray scales.

Figure 10:
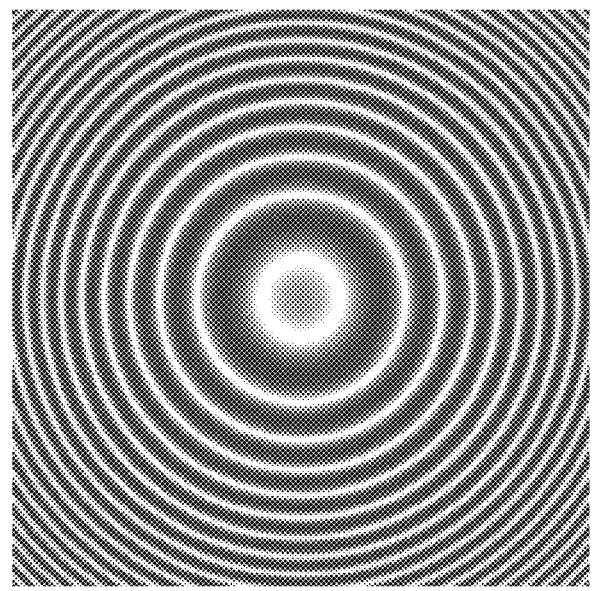
FIG. 10 is a schematic diagram showing a holographic interferogram acquired by a holographic plate according to an embodiment of the present disclosure.

In the present disclosure, magnitudes of the pixel voltages applied to the pixel electrodes 6 can be independently controlled to independently control the light transmittances of the pixel units, thereby realizing the display of a holographic interferogram. When a beam of coherent light is incident on the electrically addressed liquid crystal display panel 2, the pixel units adjust the light to cause fresnel diffraction, that is, the brightnesses of the pixel units of the electrically addressed liquid crystal display panel are controlled to form an interferogram as shown in FIG. 10, so that the light incident onto the electrically addressed liquid crystal display panel 2 is diffracted to realize the holographic image reproduction.

It should be noted that after a certain voltage is applied to the pixel electrode 6 to control the light transmittance of the pixel unit corresponding to the pixel electrode 6 to be a desired value, if the voltage applied to the pixel electrode 6 is removed (no voltage is applied to the pixel electrode 6, and no electric field is formed between the pixel electrode 6 and the common electrode 7), the former state, that is, the steady state, is maintained due to the interaction force between the smectic liquid crystal molecules, and therefore the light transmittance of the pixel unit is maintained at the desired value. Based on the principle, when a static 3D image needs to be reproduced, the corresponding voltages need to be applied to the pixel electrodes 6 of the electrically addressed liquid crystal display panel 2 only at the initial moment to control the electrically addressed liquid crystal display panel 2 to display the holographic interferogram. After a period of time (i.e., after the deflection of the liquid crystal is stable), the voltages on the pixel electrodes 6 are removed, the electrically addressed liquid crystal display panel 2 can still maintain displaying the holographic interferogram, that is, the electrically addressed liquid crystal display panel 2 can still maintain reproduction of the static 3D image, and therefore the technical scheme of the present disclosure can greatly reduce power consumption.

Based on the above characteristics, the holographic reproduction device according to the present disclosure may be used as a structure or device for displaying a static picture, such as a 3D billboard or a 3D electronic label.

With continued reference to FIG. 1, the first coherent light generated by the first light source 1 is incident onto the electrically addressed liquid crystal display panel 2 on which the holographic interferogram is displayed to reproduce the light wave information of an object beam, and the light transmitting through the electrically addressed liquid crystal display panel 2 is reflected toward the human eye by the reflective layer 8, so that an image of the recorded object can be observed with human eye.

It should be noted that, in some embodiments, in order to improve the display effect, an optical system 9 (e.g., a lens) is disposed at a light exit side of the first light source 1 to expand the light emitted from the first light source 1; and an optical system 10 (e.g., a lens) is disposed on a viewing side of the electrically addressed liquid crystal display panel 2 to converge the light from the electrically addressed liquid crystal display panel 2. It should be understood by those skilled in the art that each of the optical systems 9 and 10 is an optional structure in the present disclosure, and does not limit the present disclosure.

Figure 4:
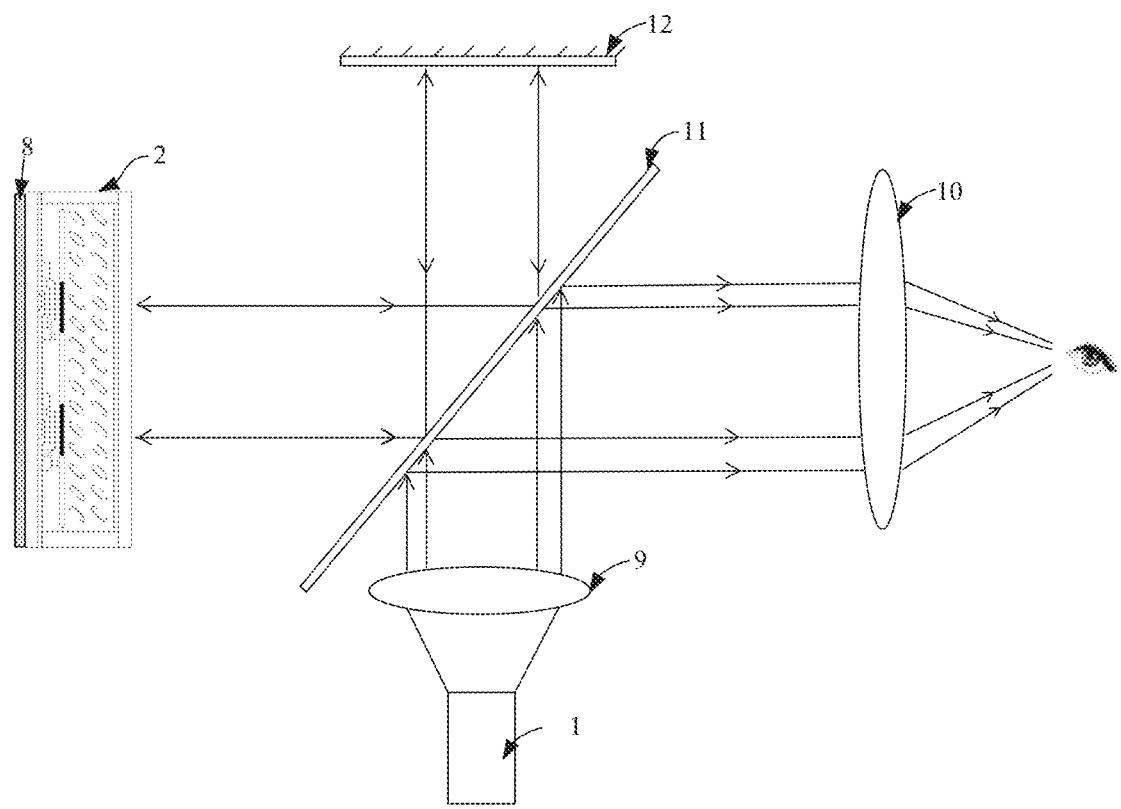
FIG. 4 is a schematic diagram showing a structure of a holographic reproduction device according to an embodiment of the present disclosure.

FIG. 4 is a schematic diagram showing a structure of a holographic reproduction device according to an embodiment of the present disclosure. As shown in FIG. 4, the holographic reproduction device shown in FIG. 4 is different from the holographic reproduction device shown in FIG. 1 in that the holographic reproduction device shown in FIG. 4 further includes: a first transflective structure 11 and a first reflective structure 12. The first transflective structure 11 and the first reflective structure 12 are arranged on the viewing side of the electrically addressed liquid crystal display panel 2. The first transflective structure 11 is configured to transmit a portion of the received first coherent light to the first reflective structure 12; and the first reflective structure 12 is configured to reflect the received light to the first transflective structure 11. The first transflective structure 11 is further configured to reflect received light reflected by the first reflective structure 12 to the electrically addressed liquid crystal display panel 2, and further transmit received light reflected by the reflective layer 8 of the electrically addressed liquid crystal display panel 2 to an optical system 10 (e.g., a lens), thereby converging the light into the human eye by the optical system 10.

Referring to FIG. 4, a portion of the first coherent light emitted from the first light source 1 transmits through the first transflective structure 11, reaches the first reflective structure 12, is reflected by the first reflective structure 12, and then reaches the first transflective structure 11 again. The portion of light is partially reflected by the first transflective structure 11 and incident onto the electrically addressed liquid crystal display panel 2. The light incident onto the electrically addressed liquid crystal display panel 2 is diffracted when the light passing through a holographic interferogram displayed on the electrically addressed liquid crystal display panel 2 to reproduce the light wave information of the object beam. The light passing through the holographic interferogram is reflected by the reflective layer 8 and then incident into human eyes, so that a 3D image of a recorded object can be observed with human eyes.

Figure 5:
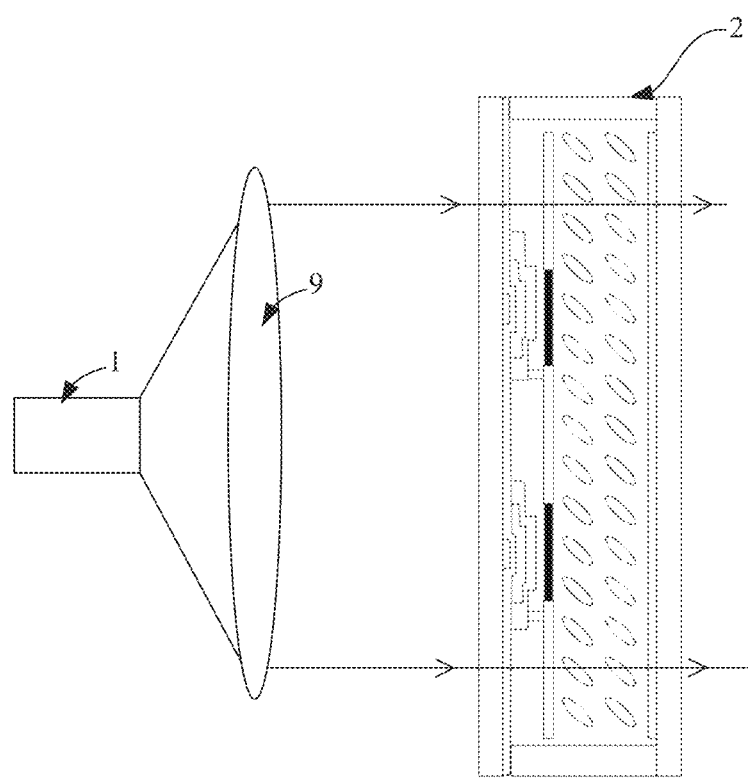
FIG. 5 is a schematic diagram showing a structure of a holographic reproduction device according to an embodiment of the present disclosure.

FIG. 5 is a schematic diagram showing a structure of a holographic reproduction device according to an embodiment of the present disclosure. As shown in FIG. 5, the electrically addressed liquid crystal display panel 2 in FIG. 5 is different from the holographic reproduction device shown in FIGS. 1 and 4 in that the electrically addressed liquid crystal display panel 2 in FIG. 5 is transmissive LCD panel without reflective layer 8 in which the first light source 1 is located on a side of the electrically addressed liquid crystal display panel 2 distal to the viewing side.

During reproduction, the first coherent light emitted from the first light source 1 is diffracted when the first coherent light passes through the holographic interferogram displayed on the electrically addressed liquid crystal display panel 2 to reproduce the light wave information of the object beam, and the light passing through the holographic interferogram is directly incident into the human eyes, so that a 3D image of the recorded object can be observed with human eyes.

Figure 6:
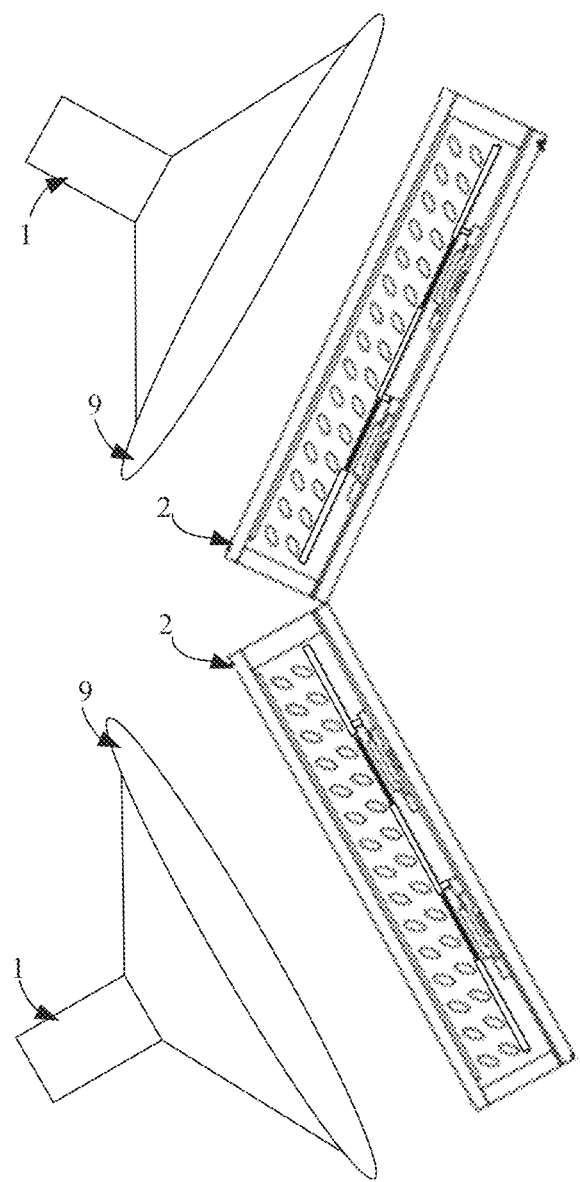
FIG. 6 is a schematic diagram showing a structure of a holographic reproduction device according to an embodiment of the present disclosure.

FIG. 6 is a schematic diagram showing a structure of a holographic reproduction device according to an embodiment of the present disclosure. As shown in FIG. 6, the holographic reproduction device shown in FIG. 6 is different from the holographic reproduction device shown in FIG. 5 in that the holographic reproduction device shown in FIG. 6 has N electrically addressed liquid crystal display panels 2, where N≥2. All the electrically addressed liquid crystal display panels 2 are arranged in sequence. Any two adjacent electrically addressed liquid crystal display panels 2 are spliced together, and the two electrically addressed liquid crystal display panels 2 spliced together form a dihedral angle which is larger or equal to 90° and less than 180°.

In the holographic reproduction device shown in FIG. 6, each of the electrically addressed liquid crystal display panels 2 displays a portion of a holographic interferogram, and images displayed on all the electrically addressed liquid crystal display panels 2 are spliced together to form the holographic interferogram. It should be noted that the process of displaying a complete image through a plurality of LCD panels 2 in a splicing manner belongs to the conventional art in the field, and will not be described in detail herein.

It should be noted that FIG. 6 only schematically shows two electrically addressed liquid crystal display panels 2. However, the number of the electrically addressed liquid crystal display panels 2 may be three or more in the present embodiment.

The holographic reproduction device shown in FIG. 6 can have an improved viewing angle, which will be described in detail below with reference to the accompanying drawings.

Figure 7A:
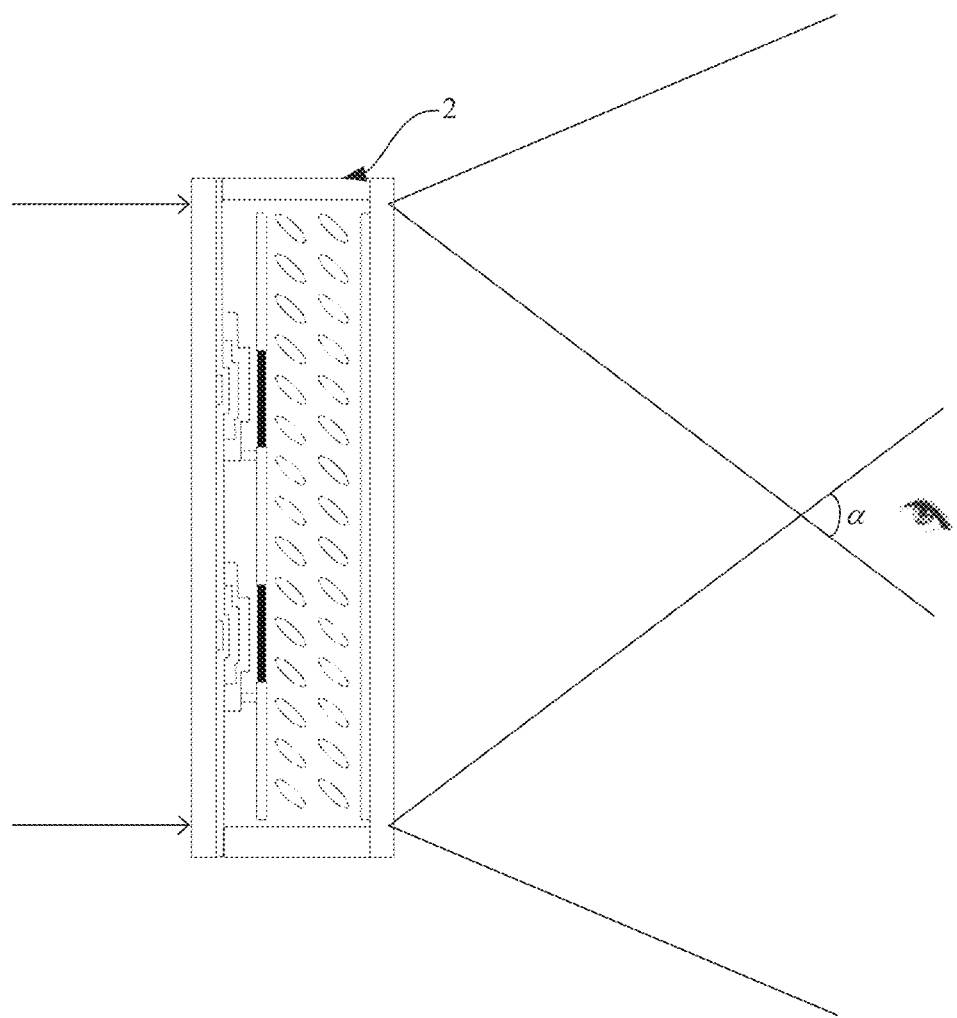
FIG. 7a is a schematic diagram showing a viewing angle of the holographic reproduction device shown in FIG. 5.
Figure 7B:
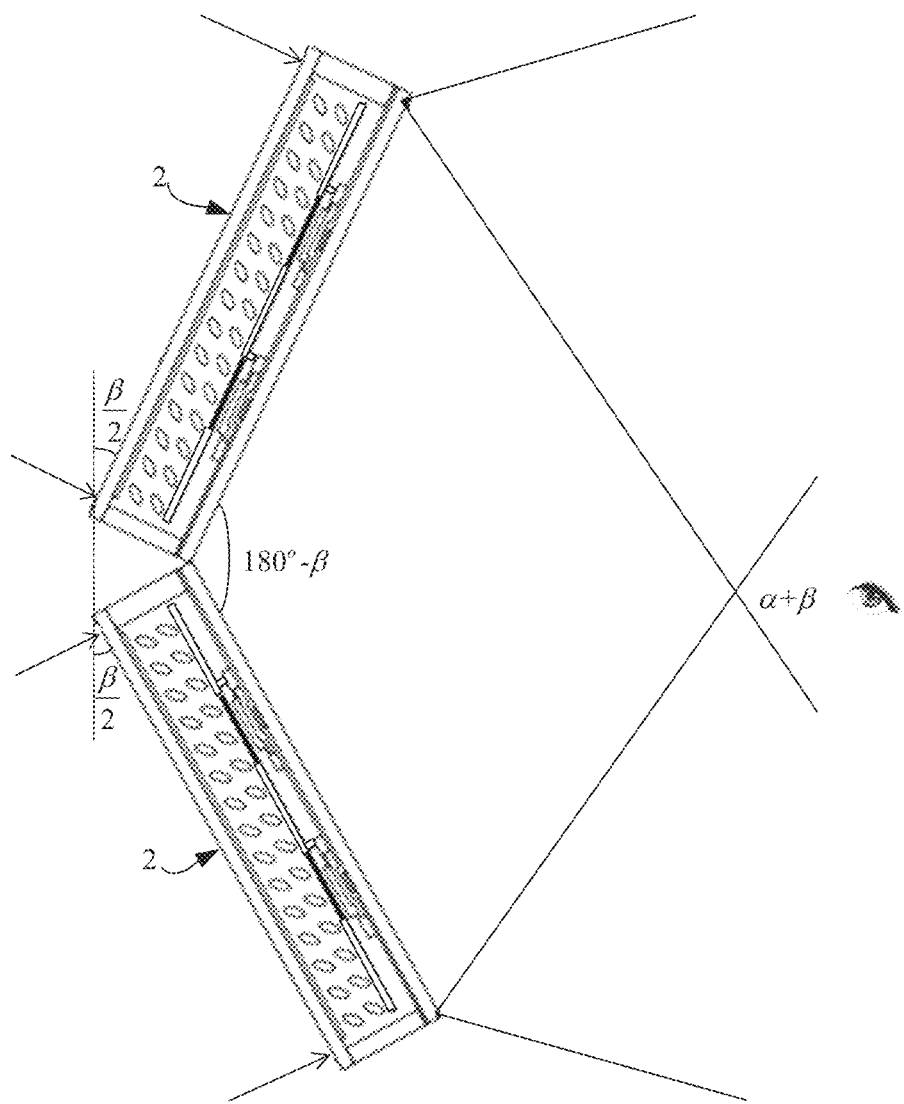
FIG. 7b is a schematic diagram showing a viewing angle of the holographic reproduction device shown in FIG. 6.

FIG. 7*a* is a schematic diagram showing a viewing angle of the holographic reproduction device shown in FIG. 5, and FIG. 7*b* is a schematic diagram showing a viewing angle of the holographic reproduction device shown in FIG. 6. As shown in FIG. 7*a* and FIG. 7*b*, assuming that a viewing angle of the holographic reproduction device shown in FIG. 5 is α, and a dihedral angle formed by the two electrically addressed liquid crystal display panels 2 in FIG. 6 is (180°−β), where β is an acute angle, and then a viewing angle of the holographic reproduction device shown in FIG. 6 is (α+β).

In the embodiment, assuming that a dihedral angle formed by a first electrically addressed liquid crystal display panel 2 and a second electrically addressed liquid crystal display panel 2 is $(180°-\beta_1)$, a dihedral angle formed by the second electrically addressed liquid crystal display panel 2 and a third electrically addressed liquid crystal display panel 2 is $(180°-\beta_2)$, . . . , and a dihedral angle formed by the $(N-1)^{th}$ electrically addressed liquid crystal display panel 2 and the $N^{th}$ electrically addressed liquid crystal display panel 2 is $(180°-\beta_{N-1})$, a viewing angle of the holographic reproduction device is $$\alpha + \sum_{j=1}^{N-1} \beta_j,$$

where $\beta_j$ is a dihedral angle formed by the $j^{th}$ electrically addressed liquid crystal display panel 2 and the $(j+1)^{th}$ electrically addressed liquid crystal display panel 2.

It should be noted that, in practical applications, when a dihedral angle of two adjacent electrically addressed liquid crystal display panels 2 is designed, it should be ensured that a viewing angle $$\alpha + \sum_{j=1}^{N-1} \beta_j$$

of the resulting holographic reproduction device is not larger than 180°.

In practical applications, considering the cost of the device and the range of the viewing angle, in an embodiment, the number of the electrically addressed liquid crystal display panels 2 is two, and the dihedral angle formed by the two electrically addressed liquid crystal display panels 2 can be designed and adjusted as needed.

In the holographic reproduction device shown in FIG. 6, an embodiment in which one first light source 1 is provided on a side of each electrically addressed liquid crystal display panels 2 distal to the viewing side and the first light sources 1 are the same light source is merely an optional implementation.

Figure 8:
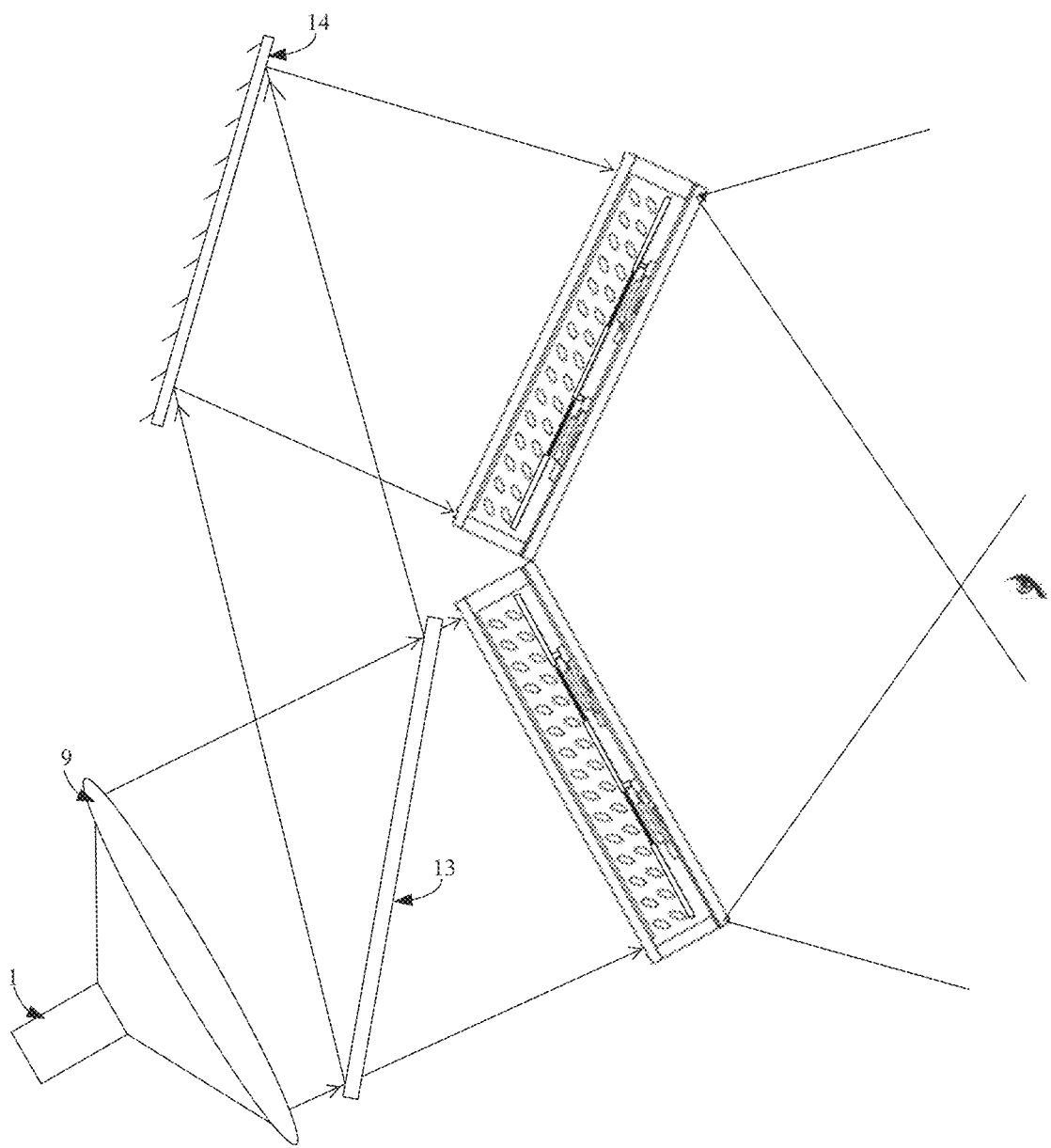
FIG. 8 is a schematic diagram showing a structure of a holographic reproduction device according to an embodiment of the present disclosure.

FIG. 8 is a schematic diagram showing a structure of a holographic reproduction device according to an embodiment of the present disclosure. As shown in FIG. 8, the holographic reproduction device shown in FIG. 8 is different from the holographic reproduction device shown in FIG. 6 in that the holographic reproduction device shown in FIG. 8 has only one first light source 1. Among all the electrically addressed liquid crystal display panels 2, a second transflective structure 13 is located on a side, distal to the viewing side, of each of the electrically addressed liquid crystal display panels 2 except the last electrically addressed liquid crystal display panels 2. A second reflective structure 14 is located on a side of the last electrically addressed liquid crystal display panel 2 distal to the viewing side. The first light source 1 is located on a side of a second transflective structure 13 corresponding to the first electrically addressed liquid crystal display panel 2 distal to the viewing side.

The second transflective structure 13 on a side of the first electrically addressed liquid crystal display panel 2 distal to the viewing side is configured to transmit a portion of the received first coherent light to the first electrically addressed liquid crystal display panel 2, and transmit another portion of the received first coherent light to a second transflective structure 13 on a side of a second electrically addressed liquid crystal display panel 2 distal to the viewing side.

A second transflective structure 13 on a side of the $i^{th}$ electrically addressed liquid crystal display panel 2 distal to the viewing side is configured to reflect a portion of the received coherent light to the $i^{th}$ electrically addressed liquid crystal display panel 2, and transmit another portion of the received coherent light to a second transflective structure 13 or a second reflective structure 14 (that is, the light passing through a second transflective structure 13 on a side of the $(N-1)^{th}$ electrically addressed liquid crystal display panel 2 distal to the viewing side transmits to a second reflective structure 14 on a side of the $N^{th}$ electrically addressed liquid crystal display panel 2 distal to the viewing side) on a side of the $(i+1)^{th}$ electrically addressed liquid crystal display panel 2 distal to the viewing side, where 1≤i≤N−1, and N is the total number of the electrically addressed liquid crystal display panels.

The second reflective structure 14 on the side of the $N^{th}$ electrically addressed liquid crystal display panel 2 distal to the viewing side is configured to reflect the received light to the $N^{th}$ electrically addressed liquid crystal display panel 2.

The holographic reproduction device shown in FIG. 8 can have a reduced number of first light sources 1 as compared to the embodiment shown in FIG. 6.

In order to make the first coherent light propagating to each of the electrically addressed liquid crystal display panels 2 have the same light intensity, so as to improve the uniformity of display brightness of the holographic reproduction device, in this embodiment, the second transflective structure 13 on the side of the first electrically addressed liquid crystal display panel 2 distal to the viewing side has a light transmittance of $$\frac{1}{N},$$

and the second transflective structure 13 on the side of the $i^{th}$ electrically addressed liquid crystal display panel 2 distal to the viewing side has a light transmittance of $$1 - \frac{1}{N-i}.$$

In the present disclosure, assuming that the first coherent light emitted from the first light source 1 has an initial light intensity of S, the first coherent light propagating to each of the electrically addressed liquid crystal display panels 2 may have a light intensity of $$\frac{S}{N}$$

based on the above design.

An embodiment of the present disclosure further provides a holographic reproduction system including the holographic reproduction device according to any one of the foregoing embodiments.

Figure 9:
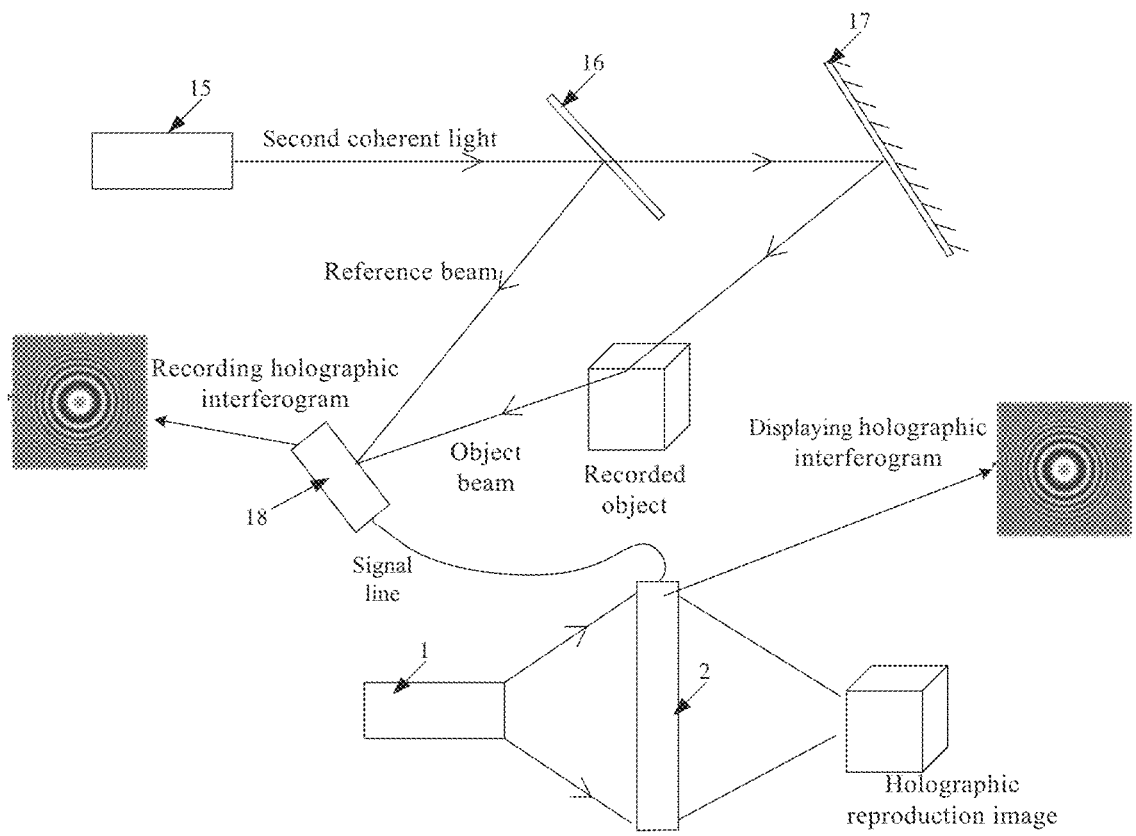
FIG. 9 is a schematic diagram showing a structure of a holographic display system according to an embodiment of the present disclosure.

FIG. 9 is a schematic diagram showing a structure of a holographic display system according to an embodiment of the present disclosure, and FIG. 10 is a schematic diagram showing a holographic interferogram acquired by a holographic plate according to an embodiment of the present disclosure. As shown in FIG. 9 and FIG. 10, an embodiment of the present disclosure further provides a holographic display system including a holographic reproduction system in which the holographic reproduction device described in the foregoing embodiment is adopted. The detailed description of the holographic reproduction device may refer to the contents in the foregoing embodiment, and is not given herein again.

In some embodiments, the holographic display system further includes a holographic recording system configured to generate a holographic interferogram of a recorded object and send display data corresponding to the holographic interferogram to the electrically addressed liquid crystal display panel 2.

In an embodiment, the holographic recording system includes: a second light source 15, a third transflective structure 16, a third reflective structure 17 and a holographic plate 18.

The second light source 15 provides second coherent light. The third transflective structure 16 reflects a portion of the second coherent light received from the second light source 15 as a reference beam to the holographic plate 18, and transmits another portion of the second coherent light received from the second light source 15 to the third reflective structure 17. The third reflective structure 17 reflects the light received from the third transflective structure 16 to the recorded object, and the light incident on the recorded object is reflected by a surface of the recorded object and then propagates to the holographic plate 18 as an object beam. The holographic plate 18 receives the reference beam and the object beam, and generates a holographic interferogram of the recorded object formed after the optical interference between the reference beam and the object beam.

In some embodiments, the second light source 15 is a laser light source, since the laser light source has good coherence.

In some embodiments, the holographic plate 18 includes a charge-coupled device (CCD for short). The charge-coupled device collects the holographic interferogram of the recorded object formed after the optical interference between the reference beam and the object beam, generates display data corresponding to the holographic interferogram, and sends the display data to the electrically addressed liquid crystal display panel 2, so that the electrically addressed liquid crystal display panel 2 displays the holographic interferogram.

The operation of the holographic display system according to this embodiment includes the following two steps: 1) holographic recording; and 2) holographic reproduction.

The holographic recording is realized by a holographic recording system, and the holographic recording is specifically as follows.

The second coherent light from the second light source 15 is incident onto the third transflective structure 16. A portion of the second coherent light is reflected by the third transflective structure 16 and then propagates to the holographic plate 18 as a reference beam, and another portion of the second coherent light transmits through the third transflective structure 16 to the third reflective structure 17. The light incident onto the third reflective structure 17 is reflected by the third reflective structure 17 to the recorded object, and the light is then reflected by the surface of the recorded object and propagates to the holographic plate 18 as an object beam, and the reference beam and the object beam interfere with each other at the holographic plate 18.

According to the wave equation of light, assuming that the complex amplitude O(x,y) of the object beam and the complex amplitude R(x,y) of the reference beam at coordinate (x, y) on the holographic plate 18 are as follows:

$$O(x,y)=O_0(x,y)\exp[j\phi_o(x,y)]$$

$$R(x,y)=R_0(x,y)\exp[j\phi_o(x,y)],$$

the object beam and the reference beam interfere at an interference plane, and the interference light field at coordinate (x, y) on the holographic plate 18 can be expressed as:

$$I(x, y) = |O(x, y) + R(x, y)|^2$$
$$= |O(x, y)|^2 + |R(x, y)|^2 + R(x, y)O^*(x, y) + R^*(x, y)O(x, y)$$

By introducing the reference beam, the phase distribution of the object beam is converted into the intensity distribution of the interference fringes. The wavefront recording has a physical significance of converting the intensity and phase information of the object beam into the light intensity distribution through the interference fringes. The light intensity distribution is recorded in a form of a two-dimensional image, and the holographic interferogram recorded by the holographic plate 18 is shown in FIG. 10.

The holographic plate 18 records the holographic interferogram to obtain corresponding display data, and transmits the display data to the holographic reproduction system in a form of an electric signal through a signal line, so that the holographic reproduction system can perform holographic reproduction subsequently.

The holographic reproduction is realized by a holographic reproduction system, and the holographic reproduction is specifically as follows.

The electrically addressed liquid crystal display panel 2 in the holographic reproduction system displays a holographic interferogram according to the received display data (it is possible that only one electrically addressed liquid crystal display panel 2 displays the holographic interferogram independently, or a plurality of electrically addressed liquid crystal display panels 2 display the holographic interferogram in a splicing manner), the first coherent light generated by the first light source 1 is incident on the electrically addressed liquid crystal display panel 2 displaying the holographic interferogram, and the first coherent light is diffracted when the first coherent light passes through the holographic interferogram to reproduce the light wave information of the object beam, thereby realizing holographic reproduction.

The principle of diffracting the first coherent light when the first coherent light passes through the holographic interferogram to reproduce the light wave information of the object beam is as follows.

As can be seen from the foregoing, the interference light field at coordinate (x, y) on the holographic interferogram is I(x,y). Assuming that the first coherent light currently incident on the holographic interferogram has the following complex amplitude at coordinate (x, y):

$$C(x,y)=C_0(x,y)\exp[j\phi_c(x,y)],$$

when the first coherent light transmits through the holographic interferogram, the resulting light wave has the following complex amplitude at coordinate (x, y):

$$U(x, y) = C(x, y)I(x, y)$$
$$= C_0 O_0^2 \exp[j\phi_c(x, y)] + C_0 R_0^2 \exp[j\phi_c(x, y)] +$$
$$C_0 O_0 R_0 \exp[j(\phi_o - \phi_r + \phi_c)] +$$
$$C_0 O_0 R_0 \exp[-j(\phi_0 - \phi_r + \phi_c)]$$

where $C_0 O_0 R_0 \exp[j(\phi_o-\phi_r+\phi_c)]$ is the light wave information (including light intensity and phase) of the reproduced object beam. Therefore the transmitted light can reproduce a 3D stereoscopic image of the recorded object.

In the present disclosure, since the liquid crystal material in the electrically addressed liquid crystal display panel 2 is the smectic liquid crystal, during the holographic reproduction process, the corresponding voltages need to be applied to the pixel electrodes 6 on the electrically addressed liquid crystal display panel 2 only at the initial time to control the electrically addressed liquid crystal display panel 2 to display the holographic interferogram. After a period of time (i.e., after the deflection of liquid crystal is stable), the voltages on the pixel electrodes 6 are removed, the electrically addressed liquid crystal display panel 2 can still maintain displaying the holographic interferogram, that is, the electrically addressed liquid crystal display panel 2 can still maintain reproduction of the static 3D image, and therefore the technical scheme of the present disclosure can greatly reduce power consumption.

It should be understood that the above implementations are merely exemplary embodiments for the purpose of illustrating the principles of the present disclosure. However, the present disclosure is not limited thereto. It will be apparent to those skilled in the art that various changes and modifications can be made without departing from the spirit and essence of the present disclosure, which are also to be regarded as falling within the scope of the present disclosure.

What is claimed is:

1. A holographic reproduction device, comprising:
   at least one electrically addressed liquid crystal display panel configured to display a holographic interferogram; and
   a first light source configured to provide first coherent light which is diffracted when transmitting through the holographic interferogram to present a holographic reproduction image;
   wherein a liquid crystal material of the electrically addressed liquid crystal display panel comprises smectic liquid crystal,
   the electrically addressed liquid crystal display panel is a transmissive liquid crystal display panel,
   the first light source is on a side of the electrically addressed liquid crystal display panel distal to a viewing side,
   the at least one electrically addressed liquid crystal display panel comprises N electrically addressed liquid crystal display panels, where N is greater than or equal to 2,
   all of the electrically addressed liquid crystal display panels are sequentially spliced, such that pictures displayed by all of the electrically addressed liquid crystal display panels are spliced to form the holographic interferogram, and any two adjacent electrically addressed liquid crystal display panels are spliced together to form a dihedral angle larger than or equal to 90 degrees and smaller than 180 degrees, among all of the electrically addressed liquid crystal display panels, a side, distal to the viewing side, of each of the electrically addressed liquid crystal display panels except a last electrically addressed liquid crystal display panel is provided with a second transflective structure, a side of the last electrically addressed liquid crystal display panel distal to the viewing side is provided with a second reflective structure, the first light source is on a side of a second transflective structure corresponding to a first electrically addressed liquid crystal display panel distal to the viewing side, the second transflective structure on a side of the first electrically addressed liquid crystal display panel distal to the viewing side is configured to transmit a portion of the first coherent light received from the first light source to the first electrically addressed liquid crystal display panel, and transmit another portion of the first coherent light received from the first light source to a second transflective structure on a side of a second electrically addressed liquid crystal display panel distal to the viewing side, the second electrically addressed liquid crystal display panel being adjacent to the first electrically addressed liquid crystal display panel, a second transflective structure on a side of an $i^{th}$ electrically addressed liquid crystal display panel distal to the viewing side is configured to reflect a portion of received coherent light to the $i^{th}$ electrically addressed liquid crystal display panel, and transmit another portion of the received coherent light to a second transflective structure or the second reflective structure on a side of a $(i+1)^{th}$ electrically addressed liquid crystal display panel distal to the viewing side, the $(i+1)^{th}$ electrically addressed liquid crystal display panel being adjacent to the $i^{th}$ electrically addressed liquid crystal display panel, and $1 \le i \le N-1$, and the second reflective structure on a side of an $N^{th}$ electrically addressed liquid crystal display panel distal to the viewing side is configured to reflect received light to the $N^{th}$ electrically addressed liquid crystal display panel.

2. The holographic reproduction device according to claim 1, wherein
a second transflective structure on the side of the first electrically addressed liquid crystal display panel distal to the viewing side has a light transmittance of $$\frac{1}{N},$$

and
the second transflective structure on the side of the $i^{th}$ electrically addressed liquid crystal display panel distal to the viewing side has a light transmittance of $$1 - \frac{1}{N-i}.$$

3. The holographic reproduction device according to claim 1, wherein N is equal to 2.

4. The holographic reproduction device according to claim 1, wherein
the first light source is a laser light source.

5. The holographic reproduction device according to claim 1, further comprising:
first lens, on a light outgoing path of the first light source and configured to converge light emitted from the first light source.

6. The holographic reproduction device according to claim 1, wherein
the holographic reproduction device is a 3D billboard or a 3D electronic label.

7. A holographic reproduction system, comprising the holographic reproduction device according to claim 1.

8. A holographic display system, comprising the holographic reproduction system according to claim 7.

9. The holographic display system according to claim 8, further comprising a holographic recording system configured to generate a holographic interferogram of a recorded object, and send display data corresponding to the holographic interferogram to the electrically addressed liquid crystal display panel.

10. The holographic display system according to claim 9, wherein
the holographic recording system comprises a second light source, a third transflective structure, a third reflective structure and a holographic plate,
the second light source is configured to provide second coherent light,
the third transflective structure is configured to reflect a portion, as a reference beam, of the second coherent light received from the second light source to the holographic plate, and transmit another portion of the second coherent light received from the second light source to the third reflective structure,
the third reflective structure is configured to reflect light received from the third transflective structure to the recorded object, so that the light incident onto the recorded object is reflected by a surface of the recorded object and then propagates as an object beam to the holographic plate, and
the holographic plate is configured to receive the reference beam and the object beam, and generate the holographic interferogram of the recorded object formed after the reference beam and the object beam interfere.

11. The holographic display according to claim 10, wherein
the holographic plate comprises a charge-coupled device.

12. The holographic display according to claim 10, wherein
the second light source is a laser light source.

* * * * *